United States Patent
Yu et al.

(10) Patent No.: US 8,322,216 B2
(45) Date of Patent: Dec. 4, 2012

(54) MICROMACHINED ACCELEROMETER WITH MONOLITHIC ELECTRODES AND METHOD OF MAKING THE SAME

(76) Inventors: Duli Yu, Sugar Land, TX (US);
Fangfang Feng, Missouri City, TX (US);
Kedu Han, Sugar Land, TX (US)

( * ) Notice: Subject to any disclaimer, the term of this patent is extended or adjusted under 35 U.S.C. 154(b) by 693 days.

(21) Appl. No.: 12/564,180

(22) Filed: Sep. 22, 2009

(65) Prior Publication Data

US 2011/0067495 A1 Mar. 24, 2011

(51) Int. Cl.
*G01P 15/125* (2006.01)

(52) U.S. Cl. .................. 73/514.32; 73/514.24

(58) Field of Classification Search ............. 73/514.32, 73/504.04, 514.24; 257/E21.211; 438/50
See application file for complete search history.

(56) References Cited

U.S. PATENT DOCUMENTS

| | | | |
|---|---|---|---|
| 4,699,006 A * | 10/1987 | Boxenhorn ............... 73/514.15 |
| 4,711,128 A * | 12/1987 | Boura ....................... 73/514.18 |
| 4,922,756 A | 5/1990 | Henrion |
| 4,930,043 A | 5/1990 | Wiegand |
| 4,932,261 A | 6/1990 | Henrion |
| 5,095,752 A | 3/1992 | Suzuki et al. |
| 5,345,824 A | 9/1994 | Sherman et al. |
| 5,461,917 A | 10/1995 | Marek et al. |
| 5,600,066 A | 2/1997 | Torregrosa |
| 5,616,844 A | 4/1997 | Suzuki et al. |
| 5,652,384 A | 7/1997 | Henrion et al. |
| 5,767,405 A * | 6/1998 | Bernstein et al. .......... 73/504.16 |
| 5,831,164 A * | 11/1998 | Reddi et al. ................ 73/514.01 |
| 5,852,242 A | 12/1998 | Devolk et al. |
| 6,000,280 A * | 12/1999 | Miller et al. .................... 73/105 |
| 6,035,694 A | 3/2000 | Dupuie et al. |
| 6,040,625 A * | 3/2000 | Ip .................................. 257/719 |
| 6,315,423 B1 | 11/2001 | Yu et al. |
| 6,318,177 B2 * | 11/2001 | Buchan et al. ............. 73/514.32 |
| 6,433,401 B1 * | 8/2002 | Clark et al. .................... 257/524 |
| 6,454,421 B2 | 9/2002 | Yu et al. |
| 6,805,008 B2 | 10/2004 | Selvakumar et al. |
| 6,829,937 B2 | 12/2004 | Mahon |
| 6,938,484 B2 * | 9/2005 | Najafi et al. ................ 73/514.32 |
| 7,121,141 B2 * | 10/2006 | McNeil ....................... 73/514.32 |
| 7,194,905 B2 * | 3/2007 | Yamamoto et al. ........ 73/514.32 |
| 7,258,012 B2 * | 8/2007 | Xie ............................. 73/514.32 |
| 7,284,432 B2 * | 10/2007 | Tay et al. .................... 73/514.32 |
| 7,398,683 B2 | 7/2008 | Lehtonen |
| 7,426,863 B2 * | 9/2008 | Kuisma ....................... 73/514.32 |
| 7,484,410 B2 * | 2/2009 | Tsuji et al. .................. 73/504.04 |
| 7,578,190 B2 * | 8/2009 | Lin et al. .................... 73/514.29 |
| 7,682,861 B2 * | 3/2010 | Blomqvist .................... 438/68 |
| 8,082,790 B2 * | 12/2011 | Dube et al. ................. 73/504.15 |
| 8,136,400 B2 * | 3/2012 | Axelrod et al. ................ 73/510 |
| 8,187,902 B2 * | 5/2012 | Weinberg et al. .............. 438/50 |

(Continued)

*Primary Examiner* — Peter Macchiarolo
*Assistant Examiner* — Samir M Shah

(57) ABSTRACT

A capacitive accelerometer having one or more micromachined acceleration sensor assembly is disclosed. The acceleration sensor assembly comprises a spring-mass-support structure, a top cap and a bottom cap. The proof mass plate of the spring-mass-support structure has cutout spaces and is supported by a pair of branched torsional beams which are substantially located in the cutout spaces. The torsional axis of the proof mass plate is offset from the mass center in direction perpendicular to the proof mass plate. The acceleration sensor assembly further comprises multiple coplanar electrodes for differential capacitive sensing and electrostatic forcing. The capacitive accelerometer according to the present invention may comprise one, two or six micromachined acceleration sensor assemblies with electronic signal detection, conditioning and control circuits in different configurations and applications to detect and measure linear and angular accelerations. Methods to fabricate the micromachined acceleration sensor assembly are disclosed.

19 Claims, 16 Drawing Sheets

U.S. PATENT DOCUMENTS

| | | | |
|---|---|---|---|
| 8,215,168 B2 * | 7/2012 | Merz et al. | 73/504.02 |
| 2001/0017058 A1 * | 8/2001 | Buchan et al. | 73/514.32 |
| 2004/0182155 A1 * | 9/2004 | Najafi et al. | 73/514.32 |
| 2006/0260401 A1 * | 11/2006 | Xie | 73/514.32 |
| 2009/0015903 A1 * | 1/2009 | Bang et al. | 359/291 |
| 2009/0139331 A1 * | 6/2009 | Axelrod et al. | 73/514.32 |
| 2009/0183570 A1 * | 7/2009 | Acar et al. | 73/514.32 |
| 2010/0089154 A1 * | 4/2010 | Ballas et al. | 73/493 |
| 2010/0170341 A1 * | 7/2010 | Dwyer et al. | 73/514.31 |

* cited by examiner

MICROMACHINED ACCELEROMETER WITH MONOLITHIC ELECTRODES AND METHOD OF MAKING THE SAME

FIELD OF THE INVENTION

This invention relates generally to a micromachined accelerometer and more particularly to a micromachined accelerometer having a torsional spring-mass-support structure featured inline motion compliance and monolithic coplanar electrodes for capacitive sensing and electrostatic forcing. This invention also relates to a micromachined accelerometer having two or more acceleration sensors with closed-loop signal detection, conditioning and control circuits for each sensor to detect and measure accelerations in two or more dimensions.

BACKGROUND OF THE INVENTION

An accelerometer is typically an electromechanical system. A single-axis or one dimensional accelerometer includes an acceleration sensor, i.e. mechanical transducer, and an electronic signal detection, conditioning and control circuit to convert a mechanical signal to an electronic signal. The acceleration sensor comprises a proof mass suspended by a spring or multiple springs on a support structure with electrodes or other means to detect proof mass displacement. A force or acceleration applied on the structure results in a displacement of proof mass from a reference position and the displacement is detected by an electronic sensing circuit which produces analog or digital output signals proportional to the acceleration.

To satisfy performance requirements of dynamic range, linearity, bandwidth, as well as high-sensitivity and low-noise, a high-performance accelerometer is often designed to operate in a closed-loop feedback system as a force-rebalanced accelerometer. In a force-rebalanced accelerometer, a forward circuit detects and generates a signal which is representative of the displacement that the mass has moved from a reference position due to acceleration. And a feedback circuit, in responding to the output signal of the forward circuit, generates a restoring force to return the mass to the reference position.

Accelerometers can be designed and implemented on a silicon material in form of micro-electromechanical systems (MEMS). Micromachined force-rebalanced accelerometers with capacitive sensing and electrostatic forcing have demonstrated advantages over other types of accelerometers in a combination of high-sensitivity, low-noise, good direct current (DC) response and wide bandwidth. Accelerometers of this type are shown in prior arts such as U.S. Pat. No. 4,922,756 to Henrion in 1990, U.S. Pat. No. 4,930,043 to Wiegand in 1990, U.S. Pat. No. 5,095,752 to Suzuki et al in 1992, U.S. Pat. No. 5,345,824 to Sherman et al in 1994, U.S. Pat. No. 5,616,844 to Suzuki et al in 1997, U.S. Pat. No. 5,652,384 to Henrion et al. in 1997, U.S. Pat. No. 5,852,242 to Devolk et al. in 1998, U.S. Pat. No. 6,035,694 to Dupuie et al. in 2000, U.S. Pat. No. 6,805,008 to Selvakumar et al. in 2004.

FIG. 1 shows a block diagram of an analog feedback force-rebalanced accelerometer. The closed-loop system consists of a MEMS acceleration sensor 100, a forward circuit including a differential capacitive sensing circuit 101 and a loop filter 102, and an electrostatic force feedback circuit 103. The output of the forward circuit is a representative of acceleration.

FIG. 2 shows a block diagram of a Σ-Δ digital feedback force-rebalanced accelerometer, where the forward circuit including a differential capacitive sensing circuit 201, a loop filter 202 as well as a comparator 204 to convert the output analog signal of loop filter 202 to a digital binary stream. The digital binary stream is a representative of acceleration. A feedback circuit 203, in response to the digital binary stream, generates a binary electrostatic restoring force to return the mass to the reference position.

MEMS sensors may be fabricated by surface micromachining or bulk micromachining.

The surface micromachined sensors are fabricated on a single silicon wafer. An example of a surface micromachined accelerometer is shown by U.S. Pat. No. 5,345,824 to Sherman et al in 1994. The surface micromachined accelerometers generally have low sensitivity and high noise, and thus cannot satisfy the requirements of many precision applications.

Bulk micromachined devices use multiple wafers and allow the design and implementation of sensor structures on three-dimensional multiple layer of wafers. A large wafer-thick or double wafer-thick proof mass can be utilized to attain high sensitivity and low noise. Manufacture of bulk micromachined devices require a wafer bonding, which is a complex fabrication step and affects yield as well as the cost of production. Bulk micromachined acceleration sensors are disclosed in prior arts such as U.S. Pat. No. 4,922,756 to Henrion in 1990, U.S. Pat. No. 4,930,043 to Wiegand in 1990, U.S. Pat. No. 5,095,752 to Suzuki et al in 1992, U.S. Pat. No. 5,616,844 to Suzuki et al in 1997, U.S. Pat. No. 5,652,384 to Henrion et al in 1997, U.S. Pat. No. 5,852,242 to Devolk et al. in 1998, U.S. Pat. No. 6,035,694 to Dupuie et al in 2000, U.S. Pat. No. 6,805,008 to Selvakumar et al in 2004, U.S. Pat. No. 6,829,937 to Mahon in 2004, U.S. Pat. No. 7,398,683 to Lehtonen in 2008.

FIG. 3 shows a typical bulk micromachined differential capacitive acceleration sensor in the prior arts, which has a proof mass 302 suspended between two parallel electrode plates 301 and 303 by a spring or multiple springs on a supporting structure. An external acceleration applied on the sensor structure causes proof mass 302 to move and the displacement of proof mass 302 is proportional to the acceleration when the frequencies of the applied acceleration are below a resonant frequency of the sensor structure.

It is known that two parallel electrode plates facing each other form a capacitor which capacitance C is given by:

$$C = \frac{\varepsilon A}{d_0}$$

where $\varepsilon$ is dielectric constant, A is the facing area of the two electrode plates and $d_0$ is the normal gap between the two electrode plates. The top plate 301 and the top surface of mass 302 form a top capacitor having capacitance $C_T$. And the bottom surface of mass 302 and bottom plate 303 form a bottom capacitor having capacitance $C_B$. Provided that proof mass displacement to a reference position x is zero when proof mass 302 is positioned at the middle and both top and bottom gaps are equal to $d_0$, a positive displacement x of proof mass 302 due to an external acceleration reduces the top gap and increases the bottom gap, and thus changes the capaci tances $C_T$ and $C_B$ differentially. The difference between the capacitances of the top and bottom capacitors is given by $$C_T - C_B = \frac{\varepsilon A}{(d_0 - x)} - \frac{\varepsilon A}{(d_0 + x)} = \frac{\varepsilon A}{d_0}\left(\frac{1}{1-u} - \frac{1}{1+u}\right)$$

where $u = \frac{x}{d_0}$.

It is well known in the arts that the differential capacitance can be detected by a simple sensing circuit such as a switched-capacitor circuit shown in FIG. 4, where the output voltage of the sensing circuit $V_S$ is proportional to $C_T - C_B$:

$$V_S = \frac{V_R}{C_F}(C_T - C_B)$$

The output voltage of the sensing circuit $V_S$ is a linear function of the differential capacitance $C_T - C_B$. However, the differential capacitance $C_T - C_B$ is nonlinear to the proof mass displacement x and therefore, nonlinear to the acceleration sensing. Since $C_T - C_B$ can also be expressed as:

$$C_T - C_B = \frac{\varepsilon A}{d_0}(2u + 2u^3 + 2u^5 + \dots)$$

it can be determined from the expression that the ratio of the first harmonics to its linear term is 1:1. The nonlinearity can be reduced with forcing feedback in a closed-loop system. Such an example is given by U.S. Pat. No. 4,922,756 to Henrion in 1990.

An analog electrostatic forcing can be achieved by applying the output voltage of the forward circuit $V_O$ to proof mass 302 while connecting $V_R$ to top plate 301 and $-V_R$ to bottom plate 303 as shown in FIG. 5. The electrostatic force F on proof mass 302 is given by:

$$F = \frac{\varepsilon A V_R^2}{2d_0^2}\left[\frac{(1 - V_0/V_R)^2}{(1-u^2)} - \frac{(1 + V_0/V_R)^2}{(1+u^2)}\right]$$

A $\Sigma$-$\Delta$ digital electrostatic forcing can be achieved as shown in FIG. 6A and FIG. 6B. As shown in FIG. 6A, while top plate 301 is connected to $V_R$ and the bottom plate 303 to $-V_R$, applying $-V_R$ to proof mass 302 results forcing up $F_U$, which can be given by:

$$F_U = \frac{\varepsilon A(2V_R)^2}{2d_0^2}\frac{1}{(1-u^2)}$$

As shown in FIG. 6B, while top plate 301 is connected to $V_R$ and bottom plate 303 to $V_R$, applying $V_R$ to proof mass 302 results forcing down $F_D$, which can be given by:

$$F_D = \frac{\varepsilon A(2V_R)^2}{2d_0^2}\frac{1}{(1+u^2)}$$

The capacitive sensing and electrostatic forcing may use the same electrodes alternatively with time multiplexing. An example of such a scheme is given in U.S. Pat. No. 6,035,694 to Dupuie et al. in 2000.

For high-performance accelerometers, a high order $\Sigma$-$\Delta$ closed-loop system architecture is often required in order to minimize the nonlinearity as well as to lower the quantization noise. Accelerometers of this type for high precision applications are disclosed in prior arts such as U.S. Pat. No. 5,652,384 to Henrion et al in 1997, U.S. Pat. No. 5,852,242 to Devolk et al in 1998, U.S. Pat. No. 6,035,694 to Dupuie et al. in 2000, U.S. Pat. No. 6,805,008 to Selvakumar et al. in 2004. The capacitive accelerometer comprises a MEMS sensor and a signal detection, conditioning and control integrated circuit (IC). The MEMS sensor has a large double wafer-thick proof mass symmetrically suspended between two electrode plates. The accelerometer can be configured as a fifth-order $\Sigma$-$\Delta$ closed-loop system. The MEMS accelerometer, however, is expensive due to the design and use of four layers of wafers. Besides the wafer usage, the additional bonding process also raises the cost.

Bulk micromachined acceleration sensors with proof mass supported by torsional spring suspension are disclosed in prior arts such as U.S. Pat. No. 6,829,937 to Mahon in 2004 and U.S. Pat. No. 7,398,683 to Lehtonen in 2008. However, the micro structures of this type with short beams to rigidly support large mass on silicon are believed to be prone to impact damage and may not survive in environments of many applications such as seismic data acquisitions and automobile's electronic stability control systems.

It is known in theory and practice that angular accelerations can be measured and calculated with two linear accelerometers rigidly mounted on an object with their sensing axes in parallel. The angular acceleration a of the object's rotation in a plane defined by the two parallel sensing axes separated at a distance D can be determined by $$\alpha = \frac{a_2 - a_1}{D}$$

where $a_1$ and $a_2$ are accelerations measured by the two accelerometers respectively. For accelerometers with a given resolution, the precision of the angular acceleration measurement is determined by the distance D which separates the two accelerometers. It is obvious that the distance D cannot be very small or equal to zero. In other words, the two acceleration sensors may not be placed close to each other in a small package for the purpose of measurement of angular accelerations.

The present invention provides a micromachined accelerometer which overcomes one or more limitations of the existing micromachined accelerometers.

It is an object of the present invention to provide a simple and improved acceleration sensor structure for use in closed-loop accelerometer systems with capacitive sensing and electrostatic forcing.

It is another object of the present invention to provide an acceleration sensor structure resilient to shock impact.

It is another object of the present invention to provide an acceleration sensor which is simple and easy to fabricate.

It is another object of the present invention to provide an acceleration sensor which requires a simple signal detection, conditioning and control circuitry for various applications.

It is another object of the present invention to provide an accelerometer of low cost and improved performance.

It is yet another object of the present invention to provide an accelerometer having a pair of acceleration sensors positioned back-to-back, face-to-face or side-by-side for measurement of both linear and angular accelerations.

It is a further object of the present invention to provide an inertial measurement unit which has three pairs of acceleration sensors in back-to-back arrangement and the sensor pairs are further arranged orthogonally from each other for measurement of both linear and angular accelerations of six degrees of freedom of motions.

SUMMARY OF THE INVENTION

The present invention provides a micromachined sensor assembly featuring torsionally suspended proof mass and monolithic coplanar electrodes for differential capacitive sensing and electrostatic forcing. The micromachined sensor assembly according to the present invention comprises a spring-mass-support structure with a proof mass plate having cutout spaces and suspended by a pair of branched torsional beams. The torsional beams are substantially located in the cutout spaces of the proof mass plate. This innovative feature reduces the die size of each sensor and therefore, reduces the material cost. The branched torsional beams have a feature of inline compliance with the torsional axis and are resilient to shock impact. This feature improves the reliability and the lifespan of the sensor in the environment of many practical applications.

The micromachined sensor assembly further comprises a top cap and a bottom cap. The top cap may have one or more pairs of first coplanar electrodes symmetrically positioned above and parallel to the proof mass plate when it is at the reference position of zero angular displacement. The differential capacitors formed in this way may be used to detect the angular displacement of the proof mass plate by means of differential capacitive sensing. It has an advantage in term of linearity over existing commonly found translational displacement acceleration sensors with differential capacitive sensing as shown in FIG. 3.

The bottom cap may have one or more pairs of second coplanar electrodes symmetrically positioned below and parallel to the proof mass plate when it is at the reference position of zero angular displacement. The second coplanar electrodes may be used exclusively for electrostatic forcing in closed loop feedback systems. Alternatively, the second coplanar electrodes may be connected in parallel with the first coplanar electrodes to increase sensitivity of the capacitive sensing, which provides a flexibility in sensor configuration for different applications.

Methods to fabricate the spring-mass-support structure, the top cap and the bottom cap with multiple monolithic coplanar electrodes are provided.

According to present invention, one, two or six micromachined acceleration sensor assemblies may be applied in a capacitive accelerometer. Various configurations of the acceleration sensor assemblies and their applications are provided.

DETAILED DESCRIPTION OF THE PREFERRED EMBODIMENTS

Figure 7:
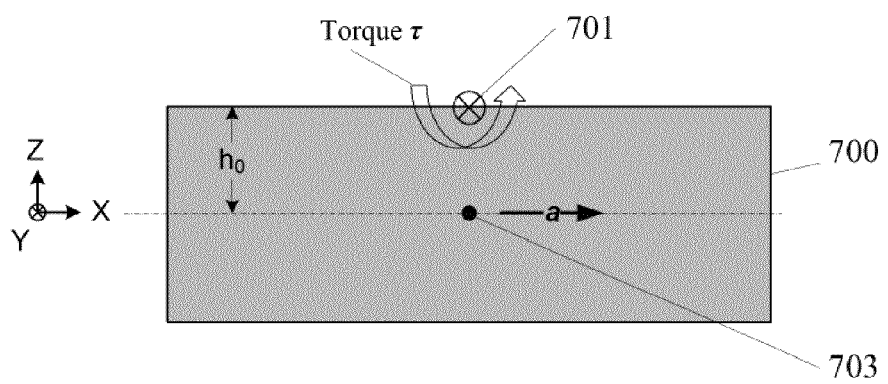
FIG. 7 is a diagram to show the operational principle of an acceleration sensor having a torsionally suspended proof mass according to the present invention.
Figure 8:
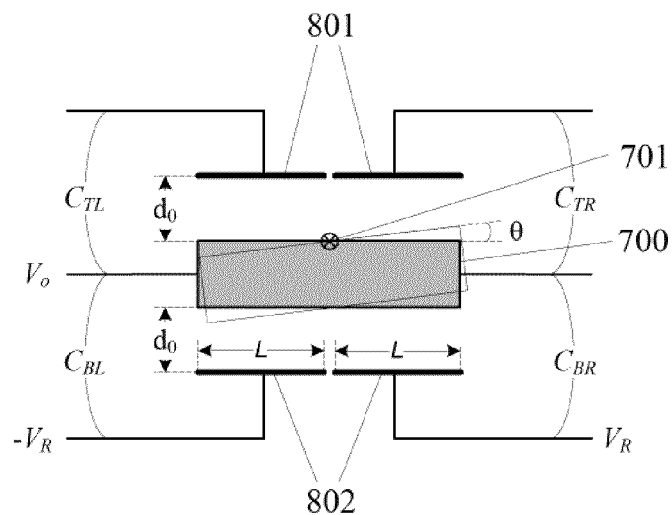
FIG. 8 is a diagram to show the operational principle of the acceleration sensor shown in FIG. 7 with multiple coplanar electrodes according to the present invention.

According to the present invention, a unique inertial sensing structure is provided for acceleration sensing. The acceleration sensing according to the present invention is illustrated in FIG. 7 and FIG. 8. A proof mass plate 700 is torsionally suspended and has a mass center 703. The torsional axis 701 is offset from mass center 703 in Z-axis direction which is perpendicular to proof mass plate 700. The proof mass plate 700 can rotate around torsional axis 701. The sensing structure is sensitive to a linear acceleration a in X-axis direction which is parallel to the proof mass plate 700 and perpendicular to torsional axis 701 as shown in FIG. 7. The linear acceleration a applied on proof mass plate 700 generates a torque τ and causes proof mass plate 700 to rotate around torsional axis 701. The torque τ can be given by $$\tau = m\, a\, h_0$$

where m is the mass of proof mass plate 700 and $h_0$ is the distance between mass center 703 and torsional axis 701. The angular displacement θ of proof mass plate 700 is determined according to a second order dynamic system:

$$mh_0^2\ddot{\theta} + d_r\dot{\theta} + m\,a\,h_0$$

where $d_r$ is a rotational damping coefficient, $k_r$ is a mechanical torsional spring constant. At the equilibrium, the angular displacement θ as a function of acceleration a is given by $$\theta = \frac{mh_0}{k_r}a$$

Figure 3:
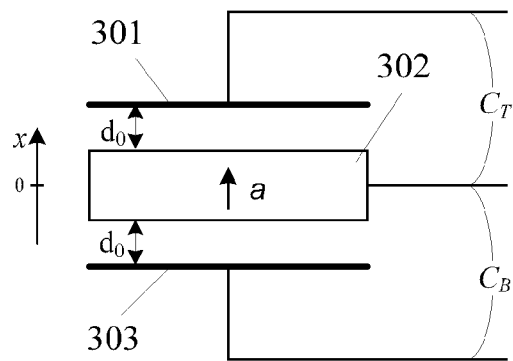
FIG. 3 is a diagram of a differential capacitive acceleration sensor according to the prior arts.

As illustrated in FIG. 8, a first pair of coplanar electrodes 801 are symmetrically positioned above and parallel to proof mass plate 700 when it is at the reference position of zero angular displacement. Each coplanar electrode 801 faces a half top surface of proof mass plate 700 on each side of torsional axis 701. The first pair of coplanar electrodes 801 and proof mass plate 700 form a first pair of differential capacitors $C_{TL}$ and $C_{TR}$, which can be used to detect the angular displacement of proof mass plate 700 by means of differential capacitive sensing. If the angular displacement of proof mass plate 700 is counterclockwise, the capacitance of $C_{TL}$ will decrease and capacitance of $C_{TR}$ will increase. The capacitance difference can be given by:

$$C_{TR} - C_{TL} = \frac{\varepsilon A}{d_0}\left(u + \frac{1}{2}u^3 + \frac{1}{3}u^5 + \ldots\right) \text{ where } u = \frac{\theta L}{d_0},$$

θ is angular displacement, $d_0$ is the normal gap between electrodes 801 and proof mass plate 700, L is the length of one of coplanar electrode, A is the area of one coplanar electrode. It can be seen that the ratio of the first harmonics to its linear term is 0.5:1. It has a 50% reduction of the first harmonics compared to existing acceleration sensors with translational displacement and differential capacitive sensing as shown in FIG. 3. The coplanar electrodes 801 are essential for precision detection of the angular displacement of proof mass plate 700 by differential capacitive sensing. For example, a pure rotation of proof mass 302 in FIG. 3 would cause the same change in capacitances of both the top and the bottom capacitors and may not be detected by differential capacitive sensing. The coplanar electrodes according to the present invention enable precise detection and measurement of angular displacement with differential capacitive sensing.

As shown in FIG. 8, a second pair of coplanar electrodes 802 are symmetrically positioned below and parallel to proof mass plate 700 when it is at the reference position of zero angular displacement. Each coplanar electrode 802 faces a half bottom surface of proof mass plate 700 on each side of torsional axis 701. The second pair of coplanar electrodes 802 and proof mass plate 700 form a second pair of differential capacitors $C_{BL}$ and $C_{BR}$, which may be used for electrostatic forcing in closed-loop feedback systems. An analog electrostatic feedback may be achieved when the output voltage of a forward circuit $V_O$ is connected to proof mass plate 700 and $+/-V_R$ reference voltages to second pair coplanar electrodes 802 as shown in FIG. 8. The analog torque feedback can be given by:

$$\tau = \frac{\varepsilon A V_R^2}{2d_0^2}$$

$$L\left[\left(1 + \frac{V_0}{V_R}\right)^2\left(\frac{1}{2} + \frac{2}{3}u + \frac{3}{4}u^2 + \ldots\right) - \left(1 - \frac{V_0}{V_R}\right)^2\left(\frac{1}{2} - \frac{2}{3}u + \frac{3}{4}u^2 - \ldots\right)\right]$$

Digital binary torque feedbacks can be achieved when $V_O$ in FIG. 8 is either $V_R$ or $-V_R$ according to the binary bitstream of the forward circuit. The binary torque feedbacks can be given by:

$$\tau_L = 4\frac{\varepsilon A V_R^2}{2d_0^2}L\left(\frac{1}{2} + \frac{2}{3}u + \frac{3}{4}u^2 + \ldots\right) \text{ for } V_O = V_R$$

$$\tau_R = -4\frac{\varepsilon A V_R^2}{2d_0^2}L\left(\frac{1}{2} - \frac{2}{3}u + \frac{3}{4}u^2 - \ldots\right) \text{ for } V_O = -V_R$$

The coplanar electrodes 802 are essential for the torsional feedback forcing. A maximum torque can be achieved only by maximizing the difference of the voltages between one coplanar electrode 802 and proof mass plate 700 and minimizing the difference of voltages between the other coplanar electrode 802 and proof mass plate 700.

It is obvious that the two pairs of coplanar electrodes may be connected in parallel for alternate capacitive sensing and electrostatic forcing with time multiplexing. An example of time multiplexing scheme is described in U.S. Pat. No. 6,035,694 to Dupuie et al. in 2000.

A micromachined acceleration sensor assembly according to the preferred embodiment of the present invention is provided. The micromachined sensor assembly, as shown in FIG. 9-FIG. 12, comprises a spring-mass-support structure 900, a top cap 901 bonded on the top side of spring-mass-support structure 900 and a bottom cap 902 bonded on the bottom side of spring-mass-support structure 900.

Figure 10:
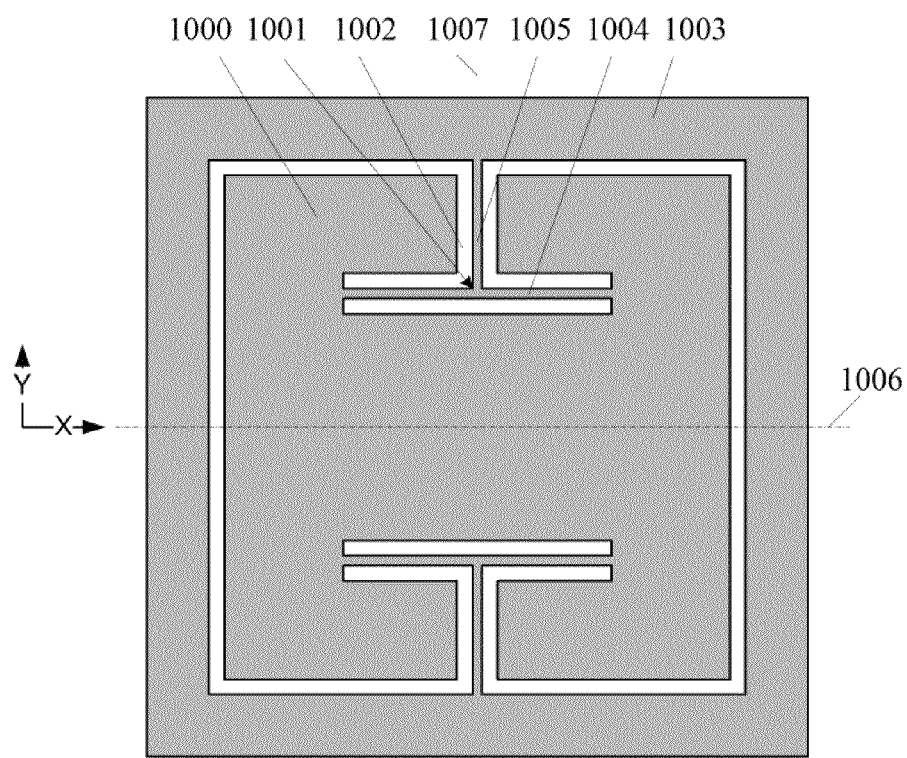
FIG. 10 is a top view of the spring-mass-support structure with a proof mass plate having cutout spaces and a pair of branched torsional beams in the preferred embodiment of the present invention.

The spring-mass-support structure 900, from top view as shown in FIG. 10, comprises a frame 1003, a proof mass plate 1000 and a pair of branched torsional beams 1001. The proof mass plate 1000 has a mass center, an X center line 1006 and a Y center line 1007.

The branched torsional beam 1001 comprises one stein beam 1005 coupled to frame 1003 and two branch beams 1004 coupled to proof mass plate 1000 such that proof mass plate 1000 is suspended by the pair of torsional beams 1001 and a torsional axis is formed along Y center line 1007. It is noticed that the torsional axis is offset from the mass center of proof mass plate 1000 in direction of perpendicular to proof mass plate 1000.

The torsional beams 1001 may be symmetrically positioned on both side of X center line 1006 so that, in top view, one torsional beam 1001 is a mirror image of the other torsional beam 1001.

As shown in FIG. 10, proof mass plate 1000 further comprises cutout spaces 1002 to receive torsional beams 1001 such that torsional beams 1001 are substantially located within cutout spaces 1002 of proof mass plate 1000.

In the preferred embodiment of the present invention, branch beams 1004 of each torsional beam 1001 are arranged in-line and perpendicular to stein beam 1005 forming a "T" shape. Alternatively, branch beams 1004 may be arranged at an angle to stein beam 1005 forming a "↑" (arrow) or "Y"

shape. When the angle between branch beams 1004 and stein beam 1005 is less than 90 degrees, branch beams 1004 and stein beam 1005 form a "T" shape. When the angle between branch beams 1004 and stein beam 1005 is larger than 90 degrees, branch beams 1004 and stein beam 1005 form a "Y" shape.

Torsional beams 1001 are rounded to reduce stress concentration at intersection points and have notches to reduce dry etch webbing effects.

In the preferred embodiment of the present invention, torsional beams 1001 are substantially located within cutout spaces 1002 of proof mass plate 1000. Alternatively, a large portion of torsional beams 1001 may be located outside of proof mass plate 1000.

The outline of proof mass plate 1000 is a rectangular in the preferred embodiment. Alternatively, the outline of proof mass plate 1000 may be other shapes which are axis-symmetrical to X-axis, Y-axis or both.

In the preferred embodiment, the shape of cutout spaces 1002 of proof mass plate 1000 follows the outline of torsional beam 1001 to maximum surface areas of proof mass plate 1000. Alternatively, cutout spaces 1002 may be rectangular or other shapes which are axis-symmetrical to X-axis, Y-axis or both.

Figure 9:
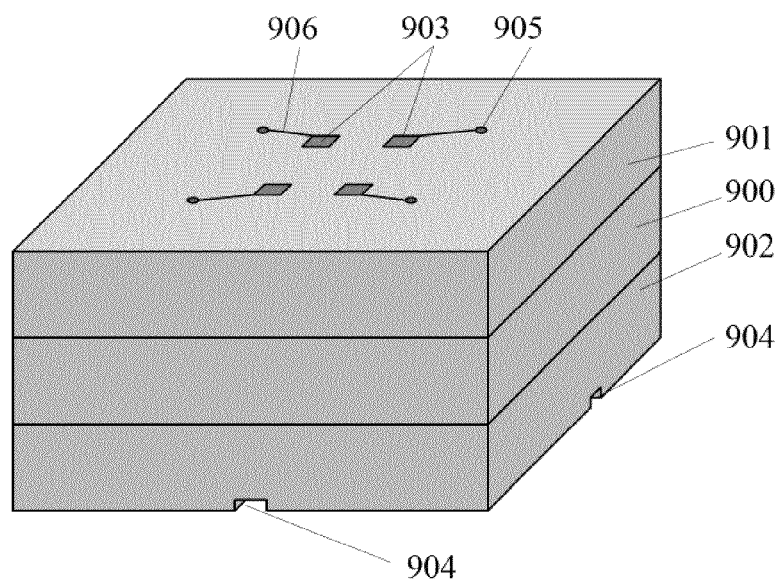
FIG. 9 is a perspective view of a micromachined acceleration sensor assembly according to a preferred embodiment of the present invention.
Figure 11A:
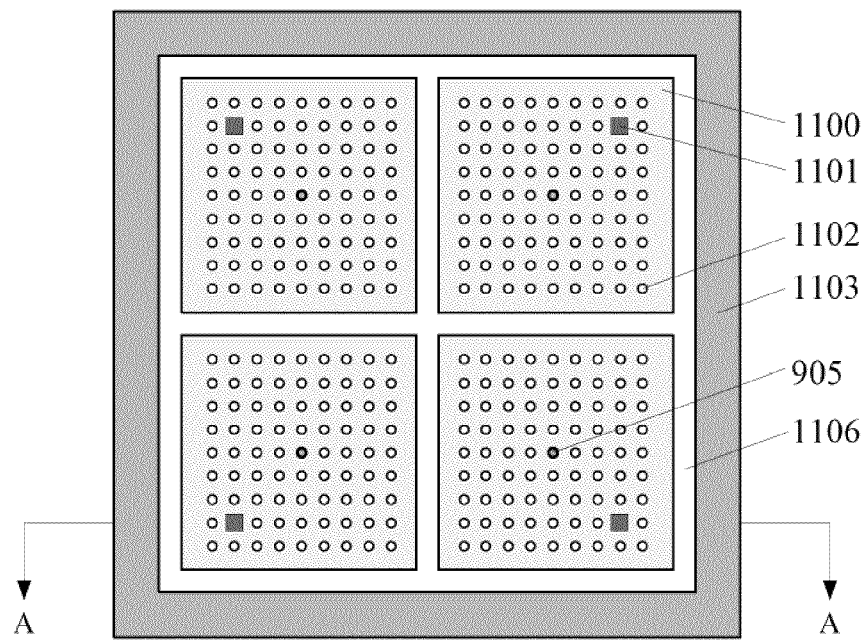
FIG. 11A is a bottom view of the top cap according to the preferred embodiment of the present invention.
Figure 11B:
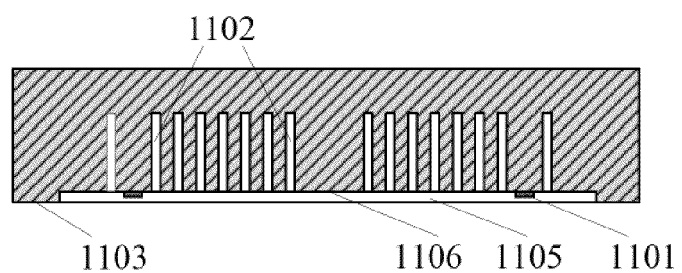
FIG. 11B is a cross section view along line A-A of the top cap shown in FIG. 11A.

The top cap 901 may include, as shown in FIG. 11A and FIG. 11B, a first gap 1105, a first depressed area 1106 and multiple first electrode pads 1100 deposed on first depressed area 1106 and electrically isolated from silicon substrate by a dielectric material of silicon dioxide or silicon nitride. In the preferred embodiment, first electrode pads 1100 form two pairs of first coplanar electrodes. The top cap 901 may further include multiple first vias 905 isolated from silicon substrate by the dielectric material and refilled with polysilicon to conduct electrically and re-seal mechanically. The top cap 901 may further include multiple wire bond pads 903 near the center of the top side and first wires 906 to connect wire bond pads 903 to vias 905 as shown in FIG. 9. The top cap 901 may further include a plurality of first non-through holes 1102 for damping control and multiple first travel stops 1101 deposed on first depressed area 1106. The top cap 901 further includes a first bonding surface 1103 for bonding to the top side of spring-mass-support structure 900.

Figure 12:
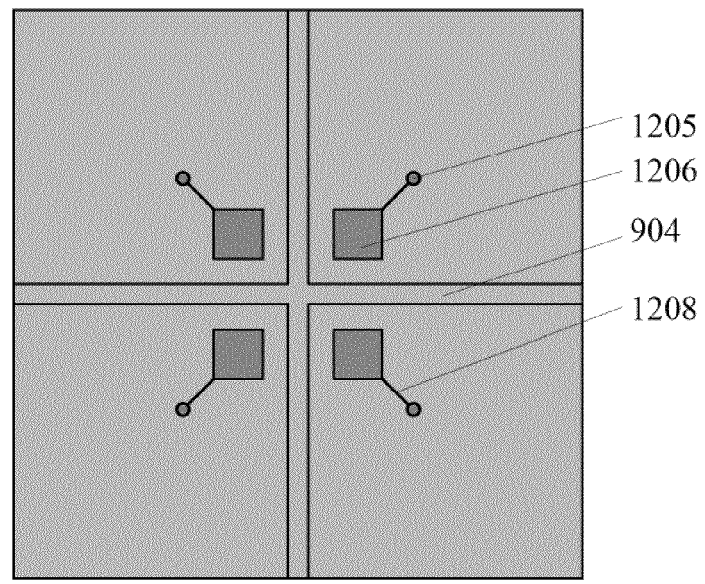
FIG. 12 is a bottom view of the bottom cap according to the preferred embodiment of the present invention.

The structure of bottom cap 902 is substantially similar to that of top cap 901 and positioned symmetrical to top cap 901. The bottom cap 902 may include a second gap, a second depressed area, multiple second electrode pads on the second depressed area and isolated from silicon substrate by dielectric material. In the preferred embodiment, the second electrode pads form two pairs of second coplanar electrodes. The bottom cap 902 may further include multiple second vias 1205 isolated from silicon substrate by dielectric material and refilled with polysilicon to electrically conduct and mechanically re-seal the vias 1205, and a plurality of second non-through holes for damping control and multiple second travel stops deposed on the second depressed area. The bottom cap 902 may further include multiple solder joint pads 1206 near the center, second wires 1208 and solder reflow prevention trenches 904 to prevent solder cross connection on the bottom side, as shown in FIG. 12. The bottom cap 902 further includes a second bonding surface for bonding to the bottom side of spring-mass-support structure 900.

Figure 13A:
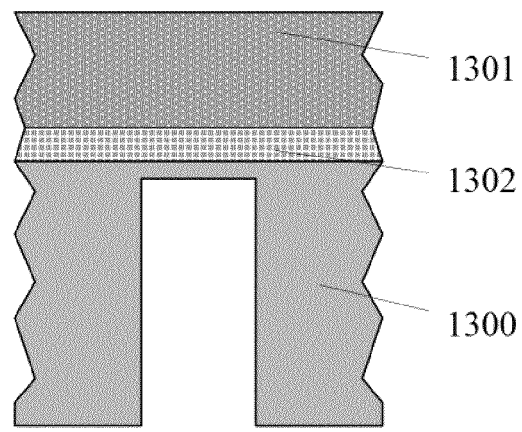
FIG. 13A-FIG. 13C are diagrams to illustrate a fabrication process of making the spring-mass-support structure according to the present invention.
Figure 13B:
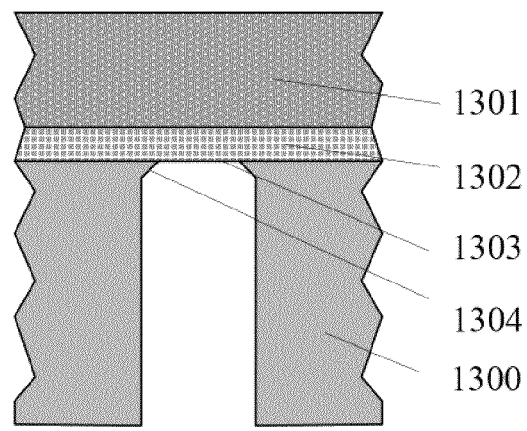
Figure 13C:
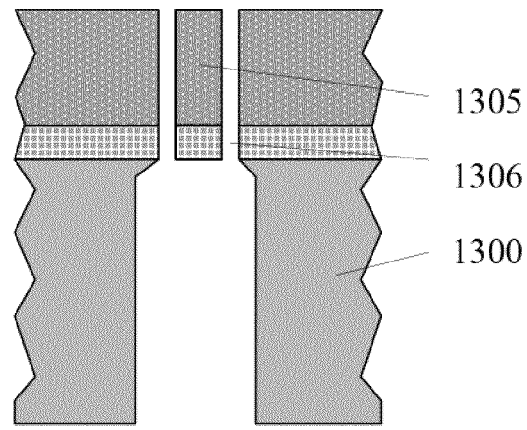

A method to fabricate spring-mass-support structure 900 is provided. As illustrated in FIG. 13A-FIG. 13C, the spring-mass-support structure 900 may be fabricated on a sandwiched silicon wafer having P+ layer 1301, P++ layer 1302 and P layer 1300. The sandwiched silicon wafer is commercially available. First from the bottom side of P layer 1300 of the sandwiched silicon wafer, a pattern of edge gaps defining the proof mass plate 1000 and the cutout spaces 1002 may be etched to a depth of 85-90% of P layer 1300 thickness with anisotropic deep reactive ion etching (DRIE) process as shown in FIG. 13A. DRIE process is well known in the art of micromaching field. Second also from the bottom side of P layer 1300 of the silicon wafer, the rest 10-15% thickness of P layer 1300 in areas of the edge gaps defining the proof mass plate 1000 and the cutout spaces may be removed with potassium hydroxide (KOH) wet etching process, which is well known in the arts. The P++ layer 1302 serves as an etching stop layer for the process. Silicon planes 1304 may be formed as a result of KOH wet etching as shown in FIG. 13B. Finally from the top side, precise gaps 1306 around proof mass plate 1000 and torsional beams 1001 may be formed by etching through both P+ layer 1301 and P++ layer 1302 with DRIE process as shown in FIG. 13C and the proof mass suspension structure including a beam section 1305 are released.

Figure 14A:
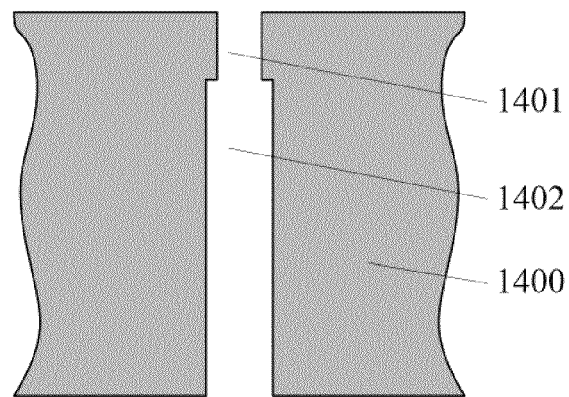
FIG. 14A-FIG. 14C are diagrams to illustrate a fabrication process of making vias and electrode pads in the top cap and the bottom cap according to the present invention.
Figure 14B:
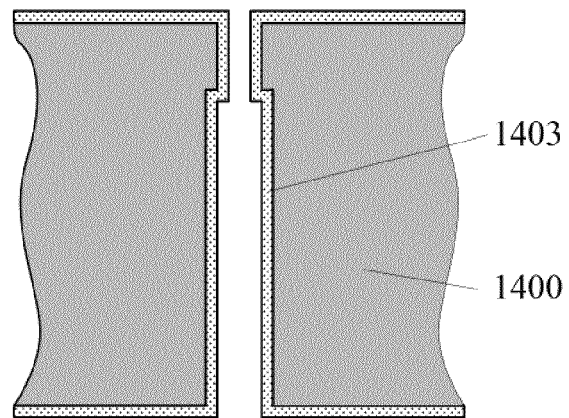
Figure 14C:
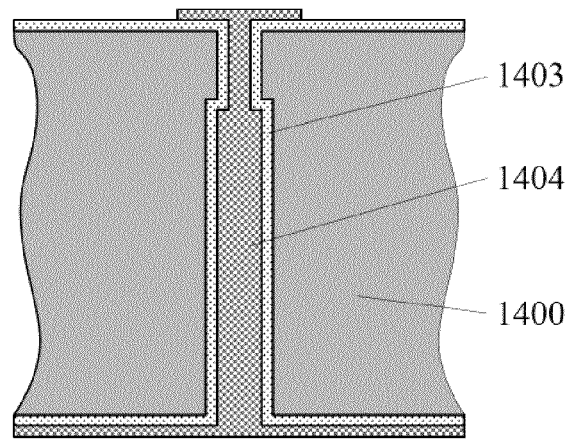

A method to fabricate top cap 901 is provided. Referring FIG. 9, FIG. 11A and FIG. 11B, top cap 901 may be fabricated on a regular silicon P wafer 1400 which is commercial available. Processing steps to make first electrode pads 1100 and first vias 905, which are electrically isolated from silicon substrate are illustrated in FIG. 14A-FIG. 14C. First, from the bottom side of regular silicon P wafer 1400, first depressed area 1106 and first travel stops 1101 may be formed with timed wet etching process. Then non-through holes in depth of 70-80% of wafer thickness for both first vias 905 and first non-through holes 1102 for damping control may be formed by etching from the bottom side with the anisotropic DRIE process. Then through holes 1402 with smaller diameter 1401 for first vias 905 may be formed with anisotropic DRIE process from the top side as shown in FIG. 14A. Then, silicon dioxide insulator 1403 in via holes 1402 and silicon dioxide insulator layer on silicon substrate may be formed with conformal depositing as shown in FIG. 14B. Then, first vias 905 sealed with polysilicon 1404 and multiple first electrode pads 1100 may be formed by growing polysilicon over the silicon dioxide insulator layer 1403 as shown in FIG. 14C. Finally, gold on selected areas may be formed on the top side of top cap 901 for wire bonding pads 903 and first wires 906 connecting to first vias 905.

The same method may be applied to fabricate bottom cap 902. The bottom cap 902 may be fabricated on another regular silicon P wafer having a top side and a bottom side. First from the top side of regular silicon P wafer, the second depressed area and the second travel stops may be formed with timed wet etching process. Then non-through holes in depth of 70-80% of wafer thickness for both second vias 1205 and the second non-through holes for damping control may be formed by etching from the top side with anisotropic DRIE process. Then through holes with smaller diameter for second vias 1205 and the solder reflow prevention trenches may be formed with anisotropic DRIE process from the bottom side. Then, silicon dioxide insulator in via holes and silicon dioxide insulator layer on silicon substrate may be formed with conformal depositing process. Then, second vias 1205 sealed with polysilicon and multiple second electrode pads may be formed by growing polysilicon over the silicon dioxide insulator layer. Finally, gold on selected areas may be formed on bottom side of bottom cap 902 for solder joint pads 1206 and second wires 1208 connecting to second vias 1205.

The top cap 901, bottom cap 902 and spring-mass-support structure 900 may be bonded by eutectic gold bonding in atmosphere to form an integrated micromachined sensor assembly. The thickness of gold film between the bonding surfaces helps to set the gap between travel stops and proof mass plate 1000. The eutectic gold bonding technique is well known in the art of MEMS field.

Alternatively, top cap 901, bottom cap 902 and spring-mass-support structure 900 may be bonded by fusion bonding in vacuum to form a monolithic micromachined sensor assembly. For fusion bonding to set gaps between travel stops and proof mass plate 1000, silicon in areas of travel stops in both top and bottom caps may be etched away shallowly. This step may be accomplished by a reactive ion etch (RIE). The fusion bonding technique is well known in the art of MEMS field.

A wire bonding pad for proof mass plate 1000 may be formed on a silicon area electrically connected to proof mass plate 1000 of the micromachined sensor assembly. The silicon area may be exposed and formed with a silicon dicing process which is well known in the arts.

The micromachined sensor assembly, in applications, may be packaged with solder joints to a printed circuit board (PCB) or a ceramic housing to reduce thermal and other environmental effects.

An electronic signal detection, conditioning and control circuit may be provided for the micromachined sensor assembly for use in a capacitive accelerometer.

Figure 1:
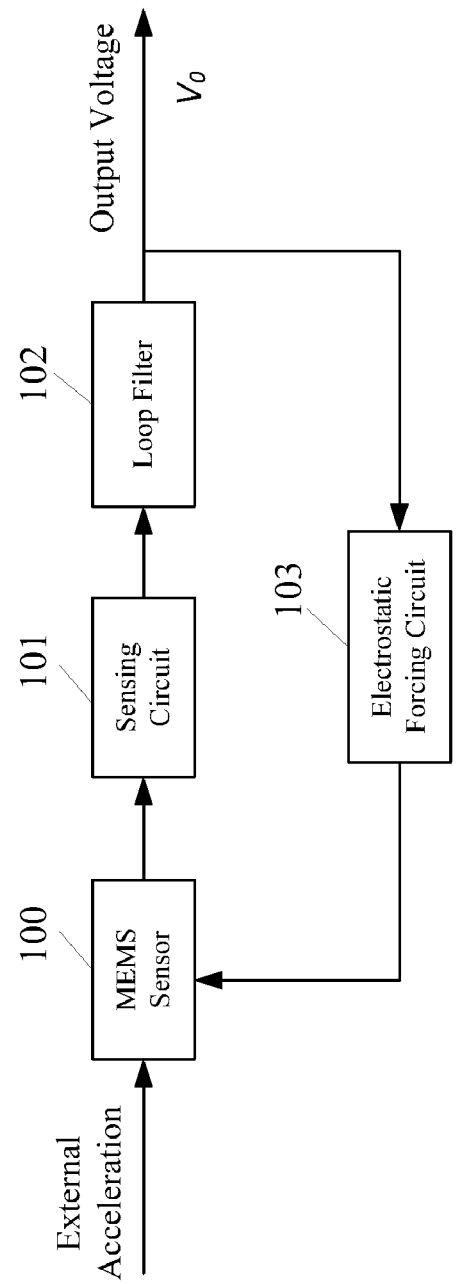
FIG. 1 is a block diagram of an analog force-rebalanced accelerometer well known in the arts.
Figure 4:
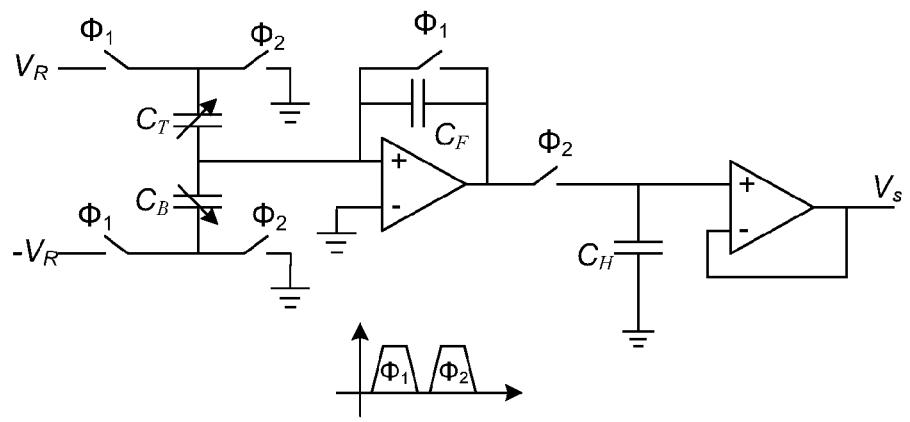
FIG. 4 is a schematic drawing of a simple differential capacitive sensing circuit well known in the arts.
Figure 5:
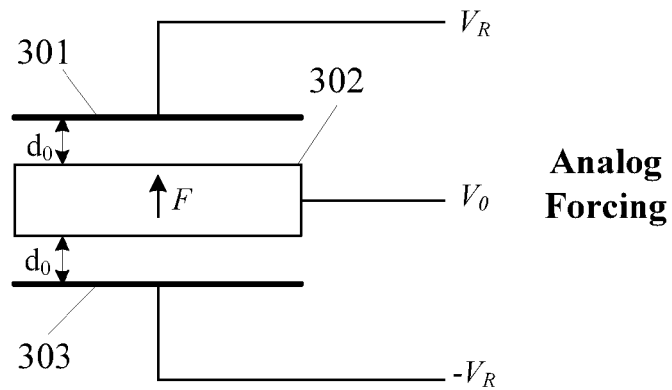
FIG. 5 is a diagram of an analog electrostatic forcing in the prior arts.
Figure 6A:
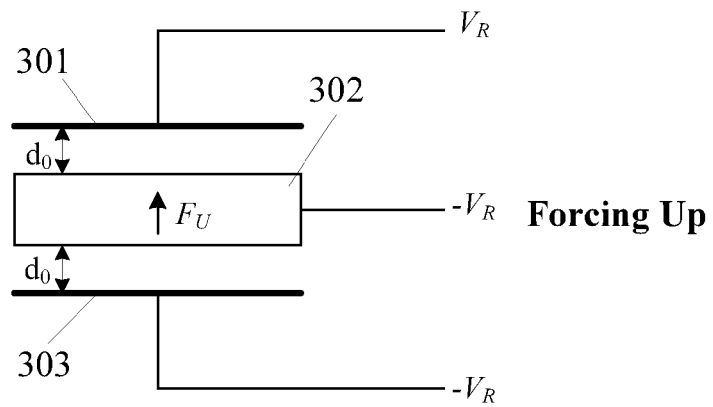
FIG. 6A is a diagram of a forcing up connection for a Σ-Δ digital electrostatic forcing in the prior arts.
Figure 6B:
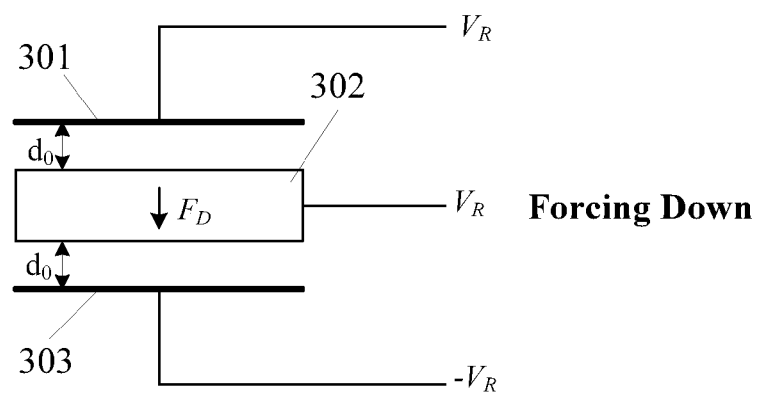
FIG. 6B is a diagram of forcing down connection for a Σ-Δ digital electrostatic forcing in the prior arts.

The micromachined sensor assembly according to the present invention may be configured as an analog force-rebalanced accelerometer in a closed-loop system as shown in FIG. 1. The analog system includes differential capacitive sensing circuit 101, loop filter 102 and feedback circuit 103 to generate electrostatic restoring force to the MEMS sensor 100. When the MEMS sensor 100 is replaced by the acceleration sensor assembly of the present invention, the angular displacement of the sensing structure may be detected and measured by a simple differential capacitive sensing circuit as shown in FIG. 4. The loop filter 102 can be a simple system compensator such as a proportional-integral-derivative (PID) controller circuit, which is well known in the arts. The analog feedback torque forcing may be implemented with feedback circuit 103 as shown in FIG. 8.

Figure 2:
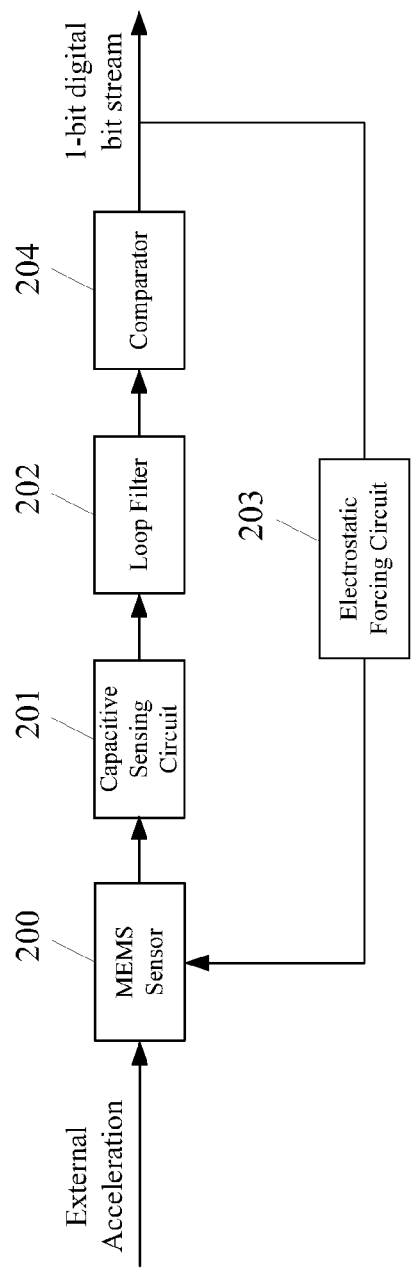
FIG. 2 is a block diagram of a Σ-Δ digital force-rebalanced accelerometer well known in the arts.

The micromachined acceleration sensor assembly according to the present invention may be configured as a Σ-Δ digital force-rebalanced accelerometer in a closed-loop system as shown in FIG. 2. The Σ-Δ system may include MEMS sensor 200, differential capacitive sensing circuit 201, loop filter 202, comparator 204 to convert the displacement signal to a binary bit stream and digital feedback circuit 203 to generate a binary electrostatic restoring force to the sensor. The MEMS sensor 200 may be replaced with the micromachined sensor assembly according to the present invention and the simple differential capacitive sensing circuit shown in FIG. 4 may be used as sensing circuit 201. The loop filter 202 can be a simple system compensator such as a PID controller circuit. Digital binary torque feedbacks may be implemented with digital feedback circuit 203 as shown in FIG. 8.

The accelerometer according to the present invention may include one, two or six micromachined acceleration sensor assemblies.

Figure 15A:
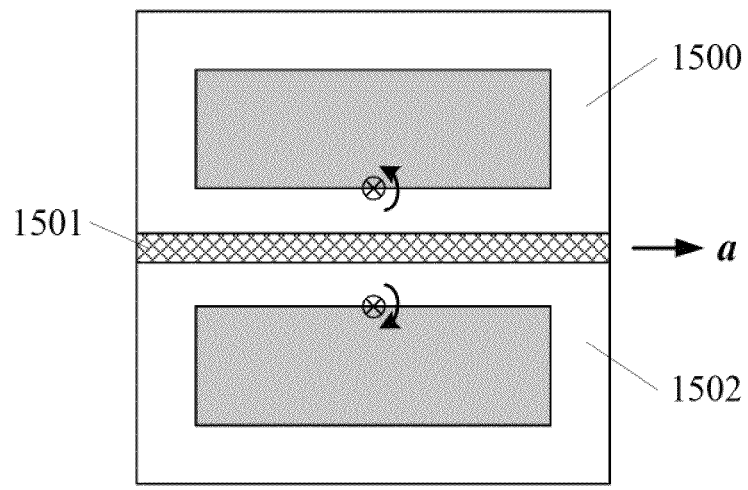
FIG. 15A and FIG. 15B are diagrams to demonstrate the principle of detecting and measuring both linear and angular accelerations by an accelerometer having two micromachined sensor assemblies in back-to-back arrangement according to the present invention.
Figure 15B:
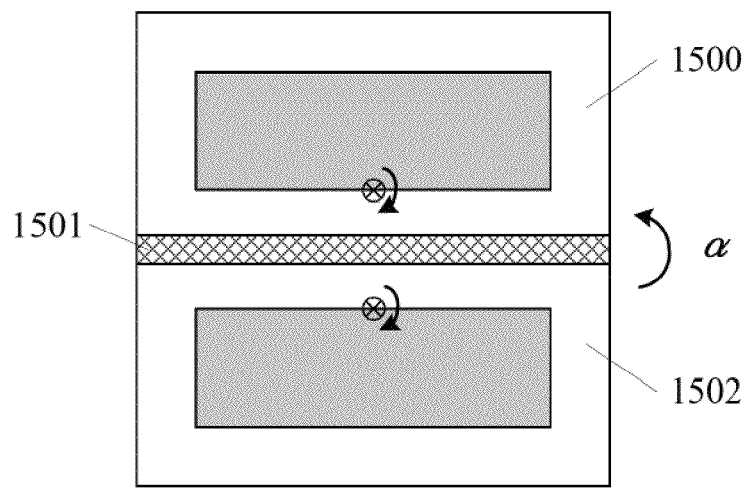

According to the present invention, an accelerometer having a package of two identical micromachined sensor assemblies in a back-to-back arrangement is capable of detecting and measuring both linear and angular accelerations. FIG. 15A and FIG. 15B illustrate the principle of detecting and calculating both linear and angular accelerations by two sensor assemblies 1500 and 1502 arranged in this way. An isolation layer such as a printed circuit board (PCB) is designated as numeral 1501. With two micromachined sensor assemblies 1500 and 1502 in back-to-back arrangement as shown in FIG. 15A, an linear acceleration a results the outputs of same magnitude but opposite polarities from two sensor assemblies 1500 and 1502, while an angular acceleration a results outputs of same magnitude and same polarity from both sensors as shown in FIG. 15B. Assuming voltage $V_1$ is an output of a sensing circuit for sensor assembly 1500 and $V_2$ for sensor assembly 1502, a measure of angular acceleration $\alpha_Y$ can be given by:

$$\alpha_Y = \frac{V_1 + V_2}{2}$$

And a linear acceleration $a_X$ can be given by:

$$a_X = \frac{V_1 - V_2}{2}$$

The simple arithmetic calculations can be easily implemented by either analog or digital electronic circuitry. For an input of a pure linear acceleration of FIG. 15A, the output $\alpha_Y$ will be zero. Similarly for an input of pure angular acceleration of FIG. 15B, the output $a_X$ will be zero.

Figure 16:
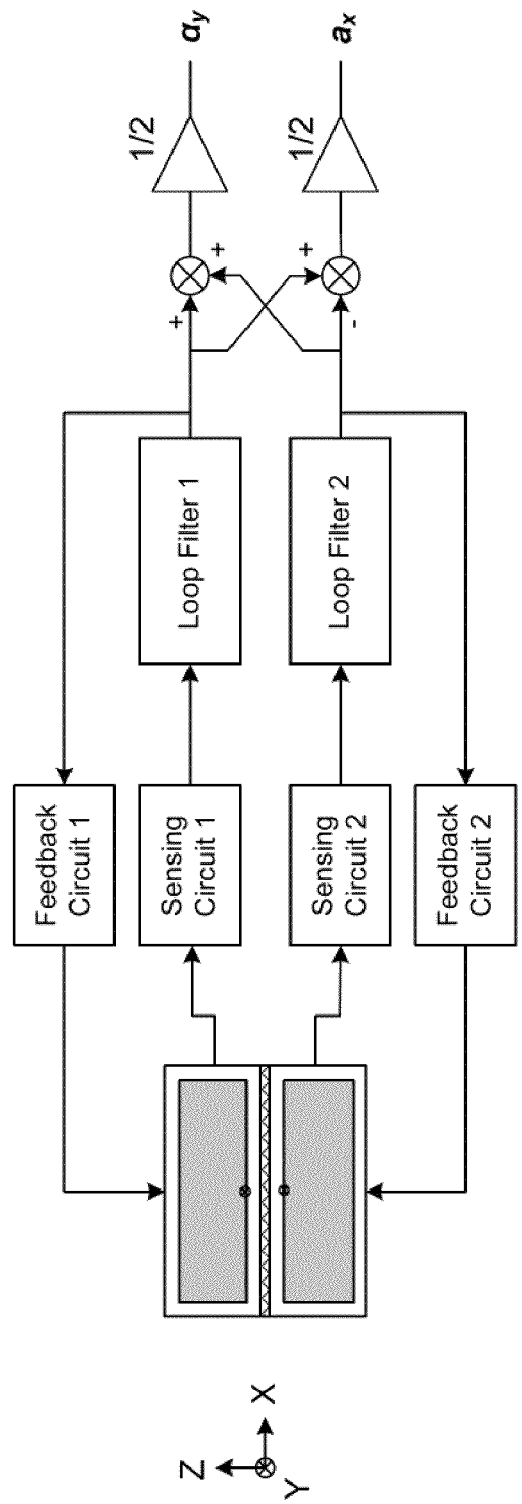
FIG. 16 is a block diagram of an accelerometer comprising a pair of micromachined sensors in back-to-back arrangement, two closed-loop signal detection, conditioning and control circuits and a simple arithmetic circuit to detect and calculate both linear and angular accelerations.

FIG. 16 is a block diagram of an accelerometer having two micromachined sensor assemblies in the back-to-back arrangement according to a preferred embodiment of the present invention. The accelerometer may include two closed-loop signal detection, conditioning and control circuits for each sensor assemblies and an arithmetic circuit to detect and measure both linear acceleration $a_X$ and angular acceleration $\alpha_Y$.

Figure 17A:
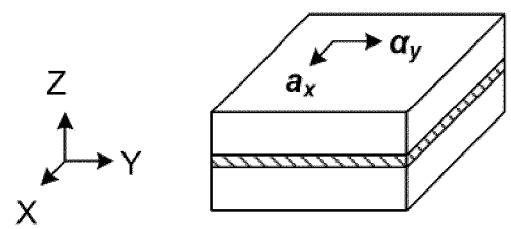
FIG. 17A and FIG. 17B are diagrams to illustrate three back-to-back sensor pairs arranged orthogonally from each other in an accelerometer to detect and measure three-dimensional linear and angular accelerations of six-degrees of freedom of motions according to the present invention.
Figure 17B:
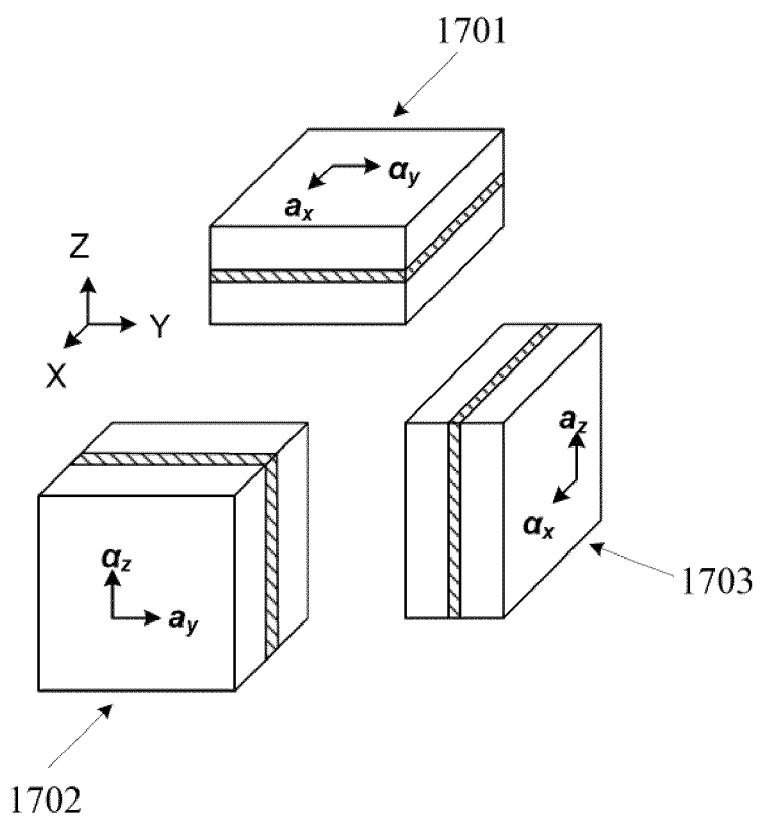

A sensor package as shown in FIG. 17A with two identical micromachined sensor assemblies in the back-to-back arrangement is capable to detect and measure linear acceleration $a_X$ and angular acceleration $\alpha_Y$. An accelerometer with three sensor packages 1701, 1702 and 1703 deposed orthogonally, as shown in FIG. 17B, may be used as an inertial measurement unit to detect and measure three dimensional linear acceleration $a_X$, $a_Y$, $a_Z$, and three dimensional angular acceleration $\alpha_Y$, $\alpha_Z$, $\alpha_X$, of six-degrees of freedom of motions. The sensor package 1701 may be used to detect $a_X$ and $\alpha_Y$, sensor package 1702 for $a_Y$ and $\alpha_Z$, and sensor package 1703 for $a_Z$ and $\alpha_X$.

Figure 18:
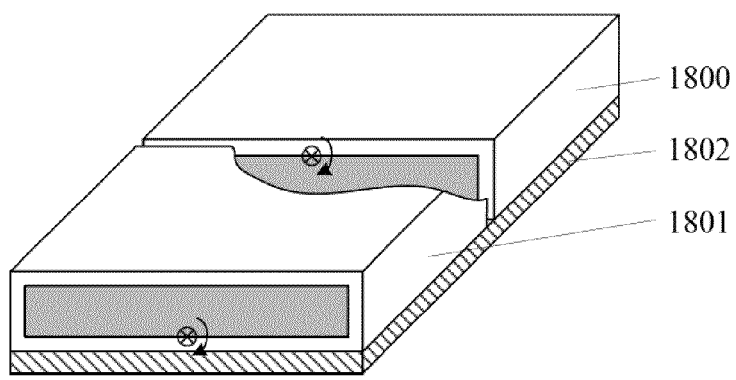
FIG. 18 is a partially exploded perspective view of a cost effective planar package of two acceleration sensor assemblies for measurement both linear and angular accelerations. The part of the front sensor structure is cut out to show the side-by-side arrangement with front sensor structure flipped 180 degrees.

It is understood that arrangements of a pair of sensors face-to-face or side-by-side with one flipped 180 degrees are equivalent to the back-to-back arrangement for the purpose of detecting and measuring both linear and angular accelerations. FIG. 18 shows a practical and cost effective planar package of two micromachined sensor assemblies 1800 and 1801 soldered on a printed circuit board 1802 in side-by-side arrangement with sensor assembly 1801 flipped 180 degrees.

It is understood that the micromachined sensor assemblies of the present invention may be used in various configurations in a capacitive accelerometer for different applications. While the present invention has been described with respect to certain preferred embodiments, it will be apparent to those skilled in the art that various changes and modifications may be made without departing from scope and spirit of the present invention as defined as following claims.

We claim:

1. A micromachined sensor assembly, for use in a capacitive accelerometer, comprising:
   (a) a spring-mass-support structure, said spring-mass-support structure having a top side and a bottom side,
   (b) a top cap bonded on the top side of said spring-mass-support structure, and (c) a bottom cap bonded on the bottom side of said spring-mass-support structure, (d) a bonding means for bonding said top cap on the top side of said spring-mass-support structure and bonding said bottom cap on the bottom side of said spring-mass-support structure;

wherein said spring-mass-support structure comprises a frame, a pair of branched torsional beams, and a proof mass plate, said proof mass plate having a center of mass and a torsional axis;

wherein each one of said pair of branched torsional beams comprises a stem beam coupled to said frame and two branch beams coupled to said proof mass plate such that said proof mass plate is suspended by said pair of torsional beams, said torsional axis is offset from said center of mass in a direction perpendicular to said proof mass plate;

wherein said proof mass plate comprises cutout spaces to receive each one of said pair of torsional beams such that said torsional beams are substantially located within said cutout spaces of said proof mass plate.

2. The micromachined sensor assembly of claim 1, wherein said torsional beams are symmetrically positioned and arranged in such a way that, in top view, one of said pair of torsional beams is a mirror image of the other of said pair of torsional beams.

3. The micromachined sensor assembly of claim 2, wherein said branch beams of each said torsional beam are positioned in-line and perpendicular to said stem beam of each said torsional beam, forming a "T" shape.

4. The micromachined sensor assembly of claim 3, wherein said top cap comprises:
   (a) a first gap, a first depressed area which is facing down to said proof mass plate,
   (b) multiple first electrode pads deposed on said first depressed area, wherein said first electrode pads are electrically isolated from a silicon substrate with dielectric material,
   (c) a plurality of first non-through holes deposed in said first depressed area for damping control,
   (d) multiple first travel stops deposed on said first depressed area,
   (e) multiple wire bond pads and multiple first wires on a top surface, said wire bond pads and first wires are electrically isolated from the silicon substrate with the dielectric material,
   (f) multiple first vias, wherein said first vias are electrically isolated from the silicon substrate with the dielectric material and filled with polysilicon material to connect said first electrode pads to corresponding said wire bond pads, and
   (g) a first bonding area for bonding to the top side of said spring-mass-support structure.

5. A method to fabricate said top cap of said micromachined sensor assembly of claim 4, said method to fabricate said top cap including steps of:
   (a) providing a silicon P wafer, said silicon P wafer having a top P side and a bottom P side;
   (b) etching said bottom P side to a predetermined depth to form said first depressed area with first travel stops by a timed wet etching process;
   (c) etching said top P side to make said first non-through holes for damping control and, at the same time, form non-through holes for said first vias by an anisotropic DRIE process;
   (d) etching said top P side to form through holes with smaller diameter for said first vias by anisotropic etching process;
   (e) depositing dielectric material to form insulator layers in the through holes of said first vias and on selected areas of said silicon P wafer;
   (f) filling and sealing said first vias with polysilicon;
   (g) growing polysilicon on selected areas to form said first electrode pads;
   (h) depositing gold on selected areas of said top P side to form said wire bonding pads and said first wires connecting to said first vias.

6. The micromachined sensor assembly of claim 3, wherein said bottom cap comprises:
   (a) a second gap, a second depressed area which is facing up to said proof mass plate,
   (b) multiple second electrode pads deposed on said second depressed area, wherein said second electrode pads are electrically isolated from a silicon substrate with a dielectric material,
   (c) a plurality of second non-through holes deposed in said second depressed area for damping control,
   (d) multiple second travel stops deposed on said second depressed area,
   (e) multiple solder joint pads and multiple second wires deposed on the bottom side, wherein said solder joint pads and said second wires are electrically isolated from the silicon substrate with the dielectric material,
   (f) multiple second vias, wherein said second vias are electrically isolated from the silicon substrate with the dielectric material and filled with polysilicon material to connect said second electrode pads to corresponding said solder joint pads,
   (g) solder reflow prevention trenches deposed on the bottom side, and
   (h) a second bonding area for bonding to the bottom side of said spring-mass-support structure.

7. A method to fabricate said bottom cap of said micromachined sensor assembly of claim 6, said method to fabricate said bottom cap including steps of:
   (a) providing a silicon P wafer, said silicon P wafer having a top P side and a bottom P side;
   (b) etching said top P side to a predetermined depth to form said second depressed area with said second travel stops by an timed wet etching process;
   (c) etching said top P side to make said second non-through holes for damping control and, at the same time, form non-through holes for said second vias by an anisotropic DRIE process;
   (d) etching said bottom P side to form through holes with smaller diameter for said second vias and to form said solder reflow prevention trenches by anisotropic etching process;
   (e) depositing dielectric material to form insulator layers in the through holes of said second vias and on selected areas of said silicon P wafer;
   (f) filling and sealing said second vias with polysilicon;
   (g) forming said second electrode pads by growing polysilicon on selected areas; and
   (h) depositing gold on selected areas on said bottom P side to form said solder joint pads and said second wires connecting to said second vias.

8. The micromachined sensor assembly of claim 3, wherein said bonding means include eutectic gold bonding in atmosphere to bond said top cap and said bottom cap on said spring-mass-support structure forming an integrated micromachined sensor assembly.

9. The micromachined sensor assembly of claim 3, wherein said bonding means include fusion bonding in vacuum to bond said top cap and said bottom cap on said spring-mass-support structure forming a monolithic micromachined sensor assembly.

10. A method to fabricate said spring-mass-support structure of said micromachined sensor assembly of claim 3, said method including steps of:
   (a) providing a sandwiched silicon wafer of P+ layer, P++ layer and P layer, said sandwiched silicon wafer having a top side P+ layer and a bottom side P layer;
   (b) etching out up to 85-90% of the thickness of said P layer from said bottom side and forming a pattern of edge gaps defining said proof mass plate and said cutout spaces with an anisotropic DRIE process;
   (c) etching out the rest 10-15% of the thickness of said P layer until P++ layer from said bottom side in areas of the edge gaps defining said proof mass plate and said cutout spaces by a wet etching process;
   (d) etching from said top side through said P+ layer and P++ layer, forming the gaps around said proof mass plate and said torsional beams and releasing said spring-mass-support structure by the DRIE process.

11. An accelerometer comprising at least one micromachined sensor assembly and an electronic signal detection, conditioning and control circuit, said micromachined sensor assembly comprising:
   (a) a spring-mass-support structure, said spring-mass-support structure having a top side and a bottom side,
   (b) a top cap,
   (c) a bottom cap,
   (d) a bonding means for bonding said top cap on the top side of said spring-mass-support structure and bonding said bottom cap on the bottom side of said spring-mass-support structure;
   wherein said spring-mass-support structure comprises a frame, a pair of branched torsional beams, and a proof mass plate, said proof mass plate having a center of mass and a torsional axis;
   wherein each one of said pair of branched torsional beams comprises a stem beam coupled to said frame and two branch beams coupled to said proof mass plate such that said proof mass plate is suspended with said pair of torsional beams, said torsional axis is offset from said center of mass in a direction perpendicular to said proof mass plate;
   wherein said proof mass plate comprises cutout spaces to receive each one of said pair of torsional beams such that said torsional beams are substantially located within said cutout spaces of said proof mass plate.

12. The micromachined sensor assembly of said accelerometer of claim 11, wherein said torsional beams are symmetrically positioned and arranged in such a way that, in top view, one of said pair of torsional beams is a mirror image of the other of said pair of torsional beams.

13. The micromachined sensor assembly of said accelerometer of claim 12, wherein two said branch beams of each said torsional beam are arranged in-line and perpendicular to said stem beam of each said torsional beam, forming a "T" shape.

14. The micromachined sensor assembly of said accelerometer of claim 13, wherein said top cap comprises:
   (a) a first gap, a first depressed area which is facing down to said proof mass plate,
   (b) multiple first electrode pads deposed on said first depressed area, said first electrode pads are electrically isolated from a silicon substrate by dielectric material,
   (c) a plurality of first non-through holes deposed in said first depressed area for damping control,
   (d) multiple first travel stops deposed on said first depressed area,
   (e) multiple wire bond pads on a top surface, said wire bond pads are electrically isolated from the silicon substrate with the dielectric material,
   (f) multiple first vias, said first vias are electrically isolated from the silicon substrate with the dielectric material and filled with polysilicon material to connect said first electrode pads to corresponding said wire bond pads, and
   (g) a first bonding area for bonding to the top side of said spring-mass-support structure.

15. The micromachined sensor assembly of said accelerometer of claim 14, wherein said bottom cap comprises:
   (a) a second gap, a second depressed area which is facing up to said proof mass plate,
   (b) multiple second electrode pads deposed on said second depressed area, said second electrode pads are electrically isolated from the silicon substrate with the dielectric material,
   (c) a plurality of second non-through holes deposed in said second depressed area for damping control,
   (d) multiple second travel stops deposed on said second depressed area,
   (e) multiple solder joint pads deposed on the bottom side, said solder joint pads are electrically isolated from the silicon substrate with the dielectric material,
   (f) multiple second vias, said second vias are electrically isolated from the silicon substrate with the dielectric and then filled with polysilicon material to connect said second electrode pads to corresponding said solder joint pads,
   (g) solder reflow prevention trenches deposed on the bottom side, and
   (h) a second bonding area for bonding to the bottom side of said spring-mass-support structure.

16. The micromachined sensor assembly of said accelerometer of claim 15, wherein said bonding means includes eutectic gold bonding in atmosphere to bond said top cap and said bottom cap on said spring-mass-support structure forming an integrated micromachined sensor assembly.

17. The micromachined sensor assembly of said accelerometer of claim 15, wherein said bonding means includes fusion bonding in vacuum to bond said top cap and said bottom cap on said spring-mass-support structure forming a monolithic micromachined sensor assembly.

18. An accelerometer of claim 15, said accelerometer comprising two said micromachined sensor assemblies arranged back-to-back, face-to-face or side-by-side with their sensing axes in-line and in opposite directions;
   whereby said electronic circuit performs signal detection, conditioning and feedback control for said micromachined sensor assemblies as well as arithmetic functions of addition and subtraction;
   whereby angular acceleration and linear acceleration can be detected and measured accurately.

19. An accelerometer of claim 15, wherein said accelerometer comprises three pairs of said micromachined sensors assemblies;
   wherein each pair of said micromachined sensor assemblies ing arranged back-to-back, face-to-face or side-by-side with their sensing axes in-line and in opposite directions;
   wherein said three pairs of micromachined sensor assemblies are further arranged orthogonally to each other;

whereby said electronic circuit performs signal detection, conditioning and feedback control for said micromachined sensor assemblies as well as arithmetic functions of addition and subtraction; whereby three dimensional angular accelerations and three dimensional linear accelerations can be detected and measured accurately.

* * * * *